(12) United States Patent
Siegele et al.

(10) Patent No.: US 12,453,936 B2
(45) Date of Patent: Oct. 28, 2025

(54) FILTER, USE OF FILTER ELEMENT IN FILTER, FILTER ELEMENT, AND MOTOR VEHICLE

(71) Applicant: MANN+HUMMEL GmbH, Ludwigsburg (DE)

(72) Inventors: Thomas Siegele, Benningen (DE); Mirco Schoen, Schauenstein (DE); Bernd Joos, Lorch (DE); Christoph Krautner, Marklkofen (DE); Mathias Hoesl, Marklkofen (DE); Jens Laddach, Dingolfing (DE); Matthias Starzer, Landau an der Isar (DE); Tobias Schwimmbeck, Dingolfing (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 353 days.

(21) Appl. No.: 18/320,984

(22) Filed: May 21, 2023

(65) Prior Publication Data
US 2023/0381703 A1 Nov. 30, 2023

Related U.S. Application Data

(63) Continuation of application No. PCT/EP2021/079374, filed on Oct. 22, 2021.

(30) Foreign Application Priority Data

Nov. 30, 2020 (DE) .......................... 102020131697.6

(51) Int. Cl.
*B01D 46/00* (2022.01)
*B01D 46/52* (2006.01)
(Continued)

(52) U.S. Cl.
CPC ..... *B01D 46/0005* (2013.01); *B01D 46/0001* (2013.01); *B01D 46/0002* (2013.01);
(Continued)

(58) Field of Classification Search
CPC ............ B01D 46/0012; B01D 46/0015; B01D 46/0002; B01D 46/0005; B01D 46/62
See application file for complete search history.

(56) References Cited

U.S. PATENT DOCUMENTS

| 3,847,577 A | 11/1974 | Hansen |
| 4,684,381 A | 8/1987 | Wasylyniuk |

(Continued)

FOREIGN PATENT DOCUMENTS

| CN | 204804987 U | * 11/2015 |
| DE | 10347103 A1 | 6/2005 |

(Continued)

*Primary Examiner* — Robert A Hopkins (57) ABSTRACT

A filter has a filter housing with a housing cover coupled to a housing part to close a receiving space receiving filter elements each provided with a filter medium body and a frame device around the filter medium body. The filter housing has a radially inwardly projecting, circumferential contact shoulder in the receiving space. The housing cover, when mounted, exerts an axial clamping force on the frame device of a first filter element. An axial end of the first filter element facing away from the housing cover rests on the frame device of a second filter element. The clamping force is transmitted through frame device of first filter element to frame device of second filter element. The frame device of the second filter element has a circumferential seal with a hollow chamber profile pressed by the clamping force on the contact shoulder to seal-tightly contact the contact shoulder.

20 Claims, 3 Drawing Sheets

(51) Int. Cl.
*B01D 46/62* (2022.01)
*B60H 3/06* (2006.01)

(52) U.S. Cl.
CPC ..... *B01D 46/0004* (2013.01); *B01D 46/0012* (2013.01); *B01D 46/0015* (2013.01); *B01D 46/0036* (2013.01); *B01D 46/521* (2013.01); *B01D 46/62* (2022.01); *B60H 3/0608* (2013.01); *B01D 2265/02* (2013.01); *B01D 2271/022* (2013.01); *B01D 2271/025* (2013.01); *B01D 2279/50* (2013.01)

(56) References Cited

U.S. PATENT DOCUMENTS

| | | | |
|---|---|---|---|
| 5,540,617 | A | 7/1996 | Siegel et al. |
| 5,853,445 | A | 12/1998 | Wong et al. |
| 6,568,540 | B1 | 5/2003 | Holzmann et al. |
| 9,587,598 | B2 * | 3/2017 | Kaufmann ......... B01D 46/0005 |
| 2004/0194441 | A1 | 10/2004 | Kirsch |
| 2010/0001477 | A1 | 1/2010 | Eyers et al. |
| 2015/0273985 | A1 | 10/2015 | Luley et al. |

FOREIGN PATENT DOCUMENTS

| | | |
|---|---|---|
| DE | 102014014396 A1 | 4/2015 |
| EP | 1208902 A1 | 5/2002 |
| EP | 1350550 A1 | 10/2003 |
| EP | 3326707 A1 | 5/2018 |
| FR | 2980119 A1 | 3/2013 |
| WO | 2020008212 A1 | 1/2020 |

\* cited by examiner

FILTER, USE OF FILTER ELEMENT IN FILTER, FILTER ELEMENT, AND MOTOR VEHICLE

CROSS-REFERENCE TO RELATED APPLICATIONS

This application is a continuation application of International Application No. PCT/EP2021/079374 filed on Oct. 22, 2021, which claims the benefit of German Application No. 102020131697.6 filed on Nov. 30, 2020, the entire disclosures of which are incorporated herein by reference for all purposes.

BACKGROUND

Embodiments concern a filter, in particular a filter for the interior of a motor vehicle, as well as a use of a filter element in the filter, a filter element as well as a motor vehicle.

The increasing air pollution, in particular in metropolitan areas, in connection with the use of modern air conditioning devices makes it necessary to purify by means of suitable filters the air which is guided from the exterior into the interior of a motor vehicle and processed or air-conditioned. For this purpose, for example, particle filters, odor filters, or their combination with each other are conceivable which are to filter out or adsorb as best as possible the suspended substances, particles, and odors contained in the ambient air.

For filtering air for the interior of a motor vehicle, often folded or pleated filter materials such as filter nonwovens forming a fold back are used. For this purpose, an initially flat filter material sheet is folded in a zigzag shape. The fold pack is held, for example, by lateral strips and head strips or another type of frame. Such filter elements can be fixed in an exchangeable manner in a filter receptacle. The thus formed filter assembly can be installed in an air conditioning device of a corresponding motor vehicle.

In order to fulfill the constantly increasing demands on the interior air quality, often so-called HEPA (high-efficiency particulate air) filters are used in modern motor vehicles.

For their protection and for extension of their service life, HEPA filters are often combined with a prefilter which is arranged upstream in flow direction and which has a coarser fineness of filtration than the HEPA filter.

DE 10 2014 004 220 A1 discloses a filter element for the interior, in particular for use as pesticide filter in an agricultural machine, which combines a HEPA filter element and a prefilter element. The filter element for the interior comprises a frame into which the HEPA filter element and the prefilter element are glued. The frame has a circumferentially extending axial seal with a solid profile with which the filter element for the interior in a mounted state can be sealed in relation to a filter housing. The prefilter element has larger dimensions than the HEPA filter element in width and length directions. The prefilter element comprises a circumferentially extending frame device by means of which it is sealed in relation to the frame. A disadvantage of this is that the HEPA filter element and the prefilter element cannot be exchanged independently of each other and that the construction with frame means a relatively large number of parts.

SUMMARY

In view of this background, it is the object of the embodiments to provide a filter, in particular a filter for an interior of a motor vehicle, with at least two filter elements in which both filter elements, in particular HEPA filter element and prefilter element, can be exchanged independently of each other and which makes due with a number of parts as small as possible.

This object is solved by a filter, in particular filter for the interior of a motor vehicle, comprising a filter housing with at least one filter housing part and a filter housing cover, wherein the filter housing comprises at least one air inflow opening and one air outflow opening, respectively, and a receiving space for receiving at least two filter elements which each comprise a filter medium body and a frame device circumferentially extending around the filter medium body, wherein in the receiving space at least one radially inwardly projecting, circumferentially extending contact shoulder for seal-tight contact of a filter element-side seal is provided, and wherein the receiving space can be closed off by the filter housing cover which can be coupled to the filter housing part in a mounted state, wherein the filter characterized in that the filter housing cover, in the mounted state, exerts an at least partially axially directed clamping force on the frame device of a first filter element, and the frame device of the first filter element with its axial end facing away from the filter housing cover rests on the frame device of a second filter element in the mounted state, whereby the clamping force is transmitted to the frame device of the second filter element, wherein the frame device of the second filter element comprises a circumferentially extending seal which is pressed by means of the clamping force on the contact shoulder of the filter housing in the mounted state, and wherein the circumferentially extending seal of the second filter element comprises a hollow chamber profile.

The object is further solved by a use of a filter element as second filter element in a filter according to the embodiments, wherein the filter element comprises a filter medium body and a frame device circumferentially extending around the filter medium body, wherein a filter housing cover, in a mounted state, exerts an at least partially axially directed clamping force on a frame device of a first filter element, and the frame device of the first filter element with its axial end facing away from the filter housing cover rests against the frame device of the filter element in the mounted state, wherein the clamping force is transmitted to the frame device of the filter element, wherein the frame device of the filter element comprises a circumferentially extending seal which can be pressed on a contact shoulder of the filter housing by means of the clamping force in the mounted state, and wherein the circumferentially extending seal of the filter element comprises a hollow chamber profile.

The object is further solved by a filter element for a filter according to the embodiments, in particular second filter element, wherein the filter element comprises a filter medium body and a frame device circumferentially extending around the filter medium body, and wherein the frame device of the filter element comprises a circumferentially extending seal which, in a mounted state of the filter element in the filter, can be pressed by means of a clamping force on a contact shoulder of a filter housing, and wherein the circumferentially extending seal of the filter element comprises a hollow chamber profile, and wherein the circumferentially extending seal of the filter element provides an axially oriented contact section which is configured for seal-tight contact of a frame device of a first filter element of the filter in the mounted state, wherein the axially oriented contact section in particular is provided by a circumferentially extending, radially retracted collar section of the seal of the filter element.

Further embodiments are subject matter of the dependent claims as well as of the embodiments described in the following.

A first aspect concerns a filter, in particular a filter for the interior of a motor vehicle. The filter comprises a filter housing with at least one filter housing part and a filter housing cover. The filter housing comprises at least one air inflow opening and one air outflow opening, respectively, and a receiving space for receiving at least two filter elements. The filter elements each comprise a filter medium body and a frame device circumferentially extending around the filter medium body. In the receiving space, at least one radially inwardly projecting, circumferentially extending contact shoulder for seal-tight contact of a filter element-side seal is provided. The receiving space can be closed off in a mounted state by the filter housing cover which can be coupled to the filter housing part. In the mounted state, the filter housing cover exerts at least partially an axially directed clamping force on the frame device of a first filter element. In the mounted state, the frame device of the first filter element is positioned with its axial end facing away from the filter housing cover at the frame device of a second filter element, whereby the clamping force is transmitted onto the frame device of the second filter element. The frame device of the second filter element comprises a circumferentially extending seal which, in the mounted state, is pressed by means of the clamping force onto the contact shoulder of the filter housing. According to the embodiments, the circumferentially extending seal of the second filter element comprises a hollow chamber profile.

In embodiments, the first and the second filter element are flowed through serially, wherein preferably the second filter element is provided downstream of the first filter element.

The filter according to the embodiments has the advantage that the first and the second filter element can be exchanged independently of each other in order to be able to take into account differences in service life of the two filter elements. In particular when the second filter element is a HEPA filter element and the first filter element is a corresponding prefilter element, the service life of the HEPA filter element is multiple times longer than the service life of the prefilter element. Furthermore, the filter according to the embodiments has the advantage that the number of parts is minimized. A separate frame for the two filter elements is not required; instead, they are immediately inserted into the filter housing. Furthermore, a reduction of the complexity of the system is achieved in that the filter according to the embodiments uses only a common seal for sealing the two filter elements in relation to the housing, wherein the first filter element can be sealed indirectly via the seal of the second filter element in relation to the housing.

Preferably, a compressive strength of the seal with hollow chamber profile of the second filter element is dimensioned such that an impermissible mechanical load of the frame device of the first filter element by seal reaction forces of the seal of the second filter element is prevented.

The hollow chamber profile of the seal of the second filter element provides for a particularly high yielding action in axial direction so that even mechanically comparatively weakly dimensioned frame devices of the first filter element can transmit the required pretension forces from the cover to the frame device of the second filter element. In particular when the frame device of the first filter element is comprised of a fiber material which has only a minimal buckling resistance, the matched compressive strength of the seal of the second filter element with hollow chamber profile is an important parameter in order to ensure a reliable and permanent sealing action of the filter elements in the filter housing.

In further embodiments, the frame device of the first filter element in the mounted state can rest on a contact section of the seal of the second filter element, whereby the first filter element is sealed in relation to the second filter element.

The contact section can be provided in particular by a circumferentially extending, radially retracted collar section of the seal of the second filter element.

In embodiments, the frame device of the first filter element can comprise or be comprised of a nonwoven material, wherein the nonwoven material is in particular a spunbond nonwoven that comprises at least a portion of synthetic fibers, in particular of PET. The frame device of the first filter element can comprise preferably so-called lateral strips and head strips which each are connected to the filter medium body, in particular glued. This is a particularly inexpensive way of providing a frame device because this can be realized for various dimensions of filter medium bodies with a uniform manufacturing technology. Filter elements constructed in this way have however only minimal mechanical load strength (bending stiffness, compressive strength). However, the filter according to the embodiments is now suitable also for the indirect sealing action of such filter elements because, due to the very minimal compressive strength of the hollow chamber profile seal of the second filter element, damages of the frame device of the first filter element can be reliably precluded.

The nonwoven material of the frame device of the first filter element can comprise a reinforcement in order to obtain predetermined mechanical properties.

In embodiments, the nonwoven material of the frame device of the first filter element can comprise an air permeability at 200 Pa between 200 l/m2s and 2,000 l/m2 s, in particular between 400 l/m2 s and 1,000 l/m2 s. As an alternative or in addition, the nonwoven material of the frame device of the first filter element can have a thickness between 0.6 mm and 5 mm, in particular between 0.8 mm and 2 mm. As an alternative or in addition, the nonwoven material of the frame device of the first filter element can comprise a weight per surface area between 100 g/m2 and 500 g/m2, in particular between 230 g/m2 and 290 g/m2.

In further embodiments, the frame device of the first filter element can be embodied along a longitudinal side and/or width side of the filter medium body in a strip shape, band shape, and/or areal shape.

In embodiments, at its axial end which is facing the filter housing cover, the frame device of the first filter element can have a rim section, at least partially in circumferential direction, which is turned over toward the filter medium body. The turned-over rim section constitutes an axially directed force introduction surface for introducing the clamping force from the filter housing cover. In embodiments in which the frame device of the first filter element comprises or is comprised a nonwoven material, the turned-over rim section can be designed as a so-called "L-angle section" which is formed by proverbial turning over or folding. The rim section can rest on a surface of the filter medium body. Moreover, the rim section can be delimited by a perforation or a cut from the remainder of the frame device for enabling a clean fold line upon turning over.

In yet other embodiments, the frame device of the second filter element can comprise a plastic frame comprising preferably an at least partially circumferentially extending, radially projecting collar which carries the seal. In particular, the radially projecting collar is provided spaced apart axially away from the axial end of the filter medium body. The plastic frame can be obtained in particular by injection molding around the filter medium body (so-called plastic over-molded filter element). It is however also possible that the filter medium body is glued into the plastic frame wherein the filter medium body in this case can comprise its own secondary frame device, in particular with lateral strips and/or head strips of a fiber material.

In embodiments, the seal of the second filter element can extend from the radially outwardly projecting collar in axial direction into a region located adjacent to the filter medium body of the second filter element so that the seal of the second filter element "overlaps" the filter medium body of the second filter element axially.

In embodiments, the seal of the second filter element can be injection molded onto the frame device, in particular in a 2K molding method, or mounted as a separate part on the frame device, in particular in the form of material available by the meter and to be correspondingly cut to length.

Embodiments provide that the seal of the second filter element has a compressive strength in a range of 0.05 N/mm to 0.7 N/mm per mm seal line, preferably 0.1 N/mm to 0.25 N/mm per mm seal line. For a dimensioning in this compressive strength range, an impermissible mechanical load of the frame device of the first filter element, in particular when the frame device is comprised of a nonwoven material, can be prevented particularly reliably.

In embodiments, the seal of the second filter element can comprise in a non-compressed state an axial extension of 10 mm to 22 mm, preferably of 14 mm to 18 mm, and/or experience a compression of 10% to 40%, preferably of 12% to 20%, in the mounted state.

In embodiments, the seal of the second filter element can comprise or be comprised of an ethylene propylene diene (monomer) rubber; this is advantageous because this material is characterized by particularly minimal fogging values. In embodiments, also other elastomers, in particular thermoplastic elastomers and/or polyurethanes, can be employed. Conceivable is in particular an elastomer according to ISO 18064 in the version at the filing date of this application, such as rubber materials, TPE, PUR, foamed polymers, and other seal materials appearing suitable to a person of skill in the art.

According to further embodiments, the seal of the second filter element can comprise at least one circumferentially extending, radially projecting seal lip configured to rest in the mounted state radially seal-tightly at an inner wall of the filter housing, preferably at an axially extending inner wall. By a combination of the seal lip with the (axially sealing) hollow chamber profile, a further improved sealing action of the filter elements in relation to the filter housing is obtained. The seal lip can be configured in particular as a pressure-assisted seal lip whose sealing action can be increased by a differential pressure action.

Moreover, the first filter element can comprise a smaller dimension than the second filter element, at least in width or length direction. Dimension does not mean in this context the dimensions of the filter medium body but the absolute outer dimensions including the frame devices and seal. Since the dimensions of the first filter element are smaller than the dimensions of the second filter element, the transmission of the clamping force in accordance with the embodiments from the frame device of the first filter element to the frame device of the second filter element is simplified.

In embodiments, the dimensions of the second filter element including frame device and seal are larger than the dimensions of the first filter element including frame device, but the dimensions of the filter medium body of the second filter element are smaller than the dimensions of the first filter element.

In embodiments, the dimensions can be as follows:
First filter element (including frame device): approximately 456 mm×172 mm
Second filter element (including frame device and seal): approximately 464 mm×180 mm
The dimensions of the filter medium body of the second filter element can amount to approximately 441 mm×157 mm.

The height of the first and/or second filter element can lie between 15 mm and 35 mm, preferably between 20 mm and 30 mm, wherein the second filter element preferably has a somewhat larger height than the first filter element.

Further embodiments provide that the filter medium bodies of the first and/or second filter element comprise a filter medium which is pleated to a folded bellows.

In this context, a fold spacing of the folded bellows of the filter medium body of the second filter element can be smaller than a fold spacing of the folded bellows of the filter medium body of the first filter element.

In embodiments, the frame device of the first filter element at its axial end facing the second filter element can project axially past the filter medium body of the first filter element. In this way, it is ensured that the clamping force is transmitted exclusively through the frame device of the first filter element (and not through the filter medium body) and the filter medium body is not compressed which might lead to a deterioration of the filtration performance (e.g., compaction of individual folds).

In variants, the fold spacing of the folded bellows of the second filter element amounts to less than 5 mm. A material thickness of the filter material of the folded bellows of the second filter element is between 0.2 mm and 1 mm, for example.

In embodiments, the filter medium body of the first filter element can comprise a particle filter medium and/or a gas adsorption medium and/or the filter medium body of the second filter element can comprise a HEPA filter medium. The HEPA filter medium can comprise in particular a membrane of an expanding PTFE which is characterized by a particularly low pressure loss as well as is very thin and thus can be folded particularly tightly so that a very large filter surface area can be made available in the second filter element.

The filter medium of the first and/or second filter element can be embodied folded or in a corrugated shape. As folds, for example, zigzag or W folds are known. Furthermore, the filter medium can be embossed and subsequently folded sharply at embossed edges with formation of fold edges. An areal filter medium sheet can serve as starting material and is correspondingly reshaped. The filter medium can comprise, for example, a filter fabric, laid filter material, filter nonwoven and/or a filter membrane.

Furthermore, the filter medium of the first and/or second filter element can be of a single-layer or multilayer configuration. Furthermore, it can comprise an adsorption medium, such as active carbon. Furthermore, the filter medium of the first and/or second filter element can comprise an antimicrobial and/or anti-allergenic action. As antimicrobial substance, for example, zinc pyrithione or nanosilver, as anti-allergenic substance, for example, polyphenol, is conceivable.

The filter medium of the second filter element corresponds preferably to an efficiency class of H13-H14 according to DIN EN 1822-3 in the version at the filing date of this application. The separation performance is preferably greater than 99.95% (@MPPS). It can comprise a grammage between 100 g/m2 and 140 g/m2. The filter medium of the second filter element is a layer configuration which comprises at least an expanded PTFE membrane which is framed at both sides by a spunbond carrier. The grammage of the PTFE membrane is preferably much smaller, in particular at least times smaller, than the grammage of the spunbond carrier.

The filter medium of the first filter element can be a combination filter medium, i.e., a filter medium which enables a particle filtration as well as a gas adsorption. The grammage can lie between 700 g/m2 and 1,200 g/m2. Preferably, the combination filter medium comprises a layer configuration, in particular with an anti-microbacterial carrier (spunlaid, grammage preferably approximately 70 g/m2), a particle filtration layer (spunbond+meltblown, grammage preferably approximately 59 g/m2) as well as an active carbon layer enclosed thereby. The active carbon has in particular a specific weight of approximately 700 g/m3 and serves as a broadband adsorber. Preferably, a mixture of various active carbon types can be present in the active carbon layer, e.g., two thirds of the active carbon can be catalytically activated and one third of the active carbon can be impregnated with phosphoric acid.

A further aspect of the embodiments concerns a use of a filter element as second filter element in a filter according to the embodiments. The filter element has a medium body and a frame device circumferentially extending around the filter medium body, wherein a filter housing cover of the filter in a mounted state exerts an at least partially axially directed clamping force on a frame device of a first filter element. In the mounted state, the frame device of the first filter element rests in this context with its axial end facing away from the filter housing cover at the frame device of the filter element, wherein the clamping force is transmitted to the frame device of the filter element. The frame device of the filter element comprises a circumferentially extending seal which, in the mounted state, can be pressed by means of the clamping force onto a contact shoulder of the filter housing. The circumferentially extending seal of the filter element comprises a hollow chamber profile, wherein preferably a compressive strength of the seal with hollow chamber profile is dimensioned such that an impermissible mechanical load of the frame device of the first filter element by seal reaction forces is prevented.

Finally, yet another aspect of the embodiments concerns a filter element for a filter according to the embodiments, in particular its second filter element. The filter element comprises a medium body and a frame device circumferentially extending around the filter medium body. The frame device of the filter element comprises a circumferentially extending seal which, in the mounted state of the filter element in the filter, can be pressed by means of a clamping force onto a contact shoulder of the filter housing. The circumferentially extending seal of the filter element comprises a hollow chamber profile. The circumferentially extending seal provides an axially directed contact section which is configured for seal-tight contact of a frame device of a first filter element of the filter in the mounted state, wherein the axially directed contact section is provided in particular by a circumferentially extending, radially retracted collar section of the circumferentially extending seal of the filter element.

All features, feature combinations, and advantages disclosed in regard to the filter according to the embodiments can be applied to the use according to the embodiments as well as to the filter element according to the embodiments, and vice versa.

Further possible implementations of the embodiments comprise also combinations, not explicitly mentioned, of features or method steps described before or in the following with respect to the embodiments. In this context, a person of skill in the art will also add individual aspects as improvements or supplements to the respective basic form of the embodiments.

In the following, the embodiments will be explained in more detail with the aid of embodiments with reference to the attached Figures.

DETAILED DESCRIPTION

Figure 1:
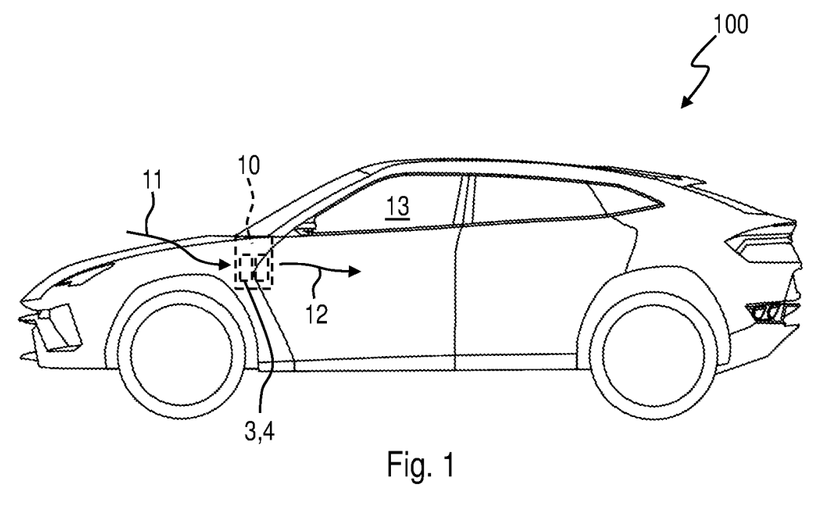
FIG. 1 shows a schematic illustration of a motor vehicle according to the embodiments.

In FIG. 1, a motor vehicle 100 according to the embodiments is shown in a schematic illustration. The motor vehicle 100 comprises a filter 10 for the interior in accordance with the embodiments by means of which raw air 11 originating from the exterior is purified and can be supplied as clean air 12 to the interior 13. The filter 10 for the interior has two filter elements, a first filter element 3 and a second filter element 4, which can be flowed through in particular serially. The second filter element 4 can be a HEPA filter element and the first filter element 3 can be a prefilter element which is matched with respect to its filtration parameters to the HEPA filter element.

Figure 2:
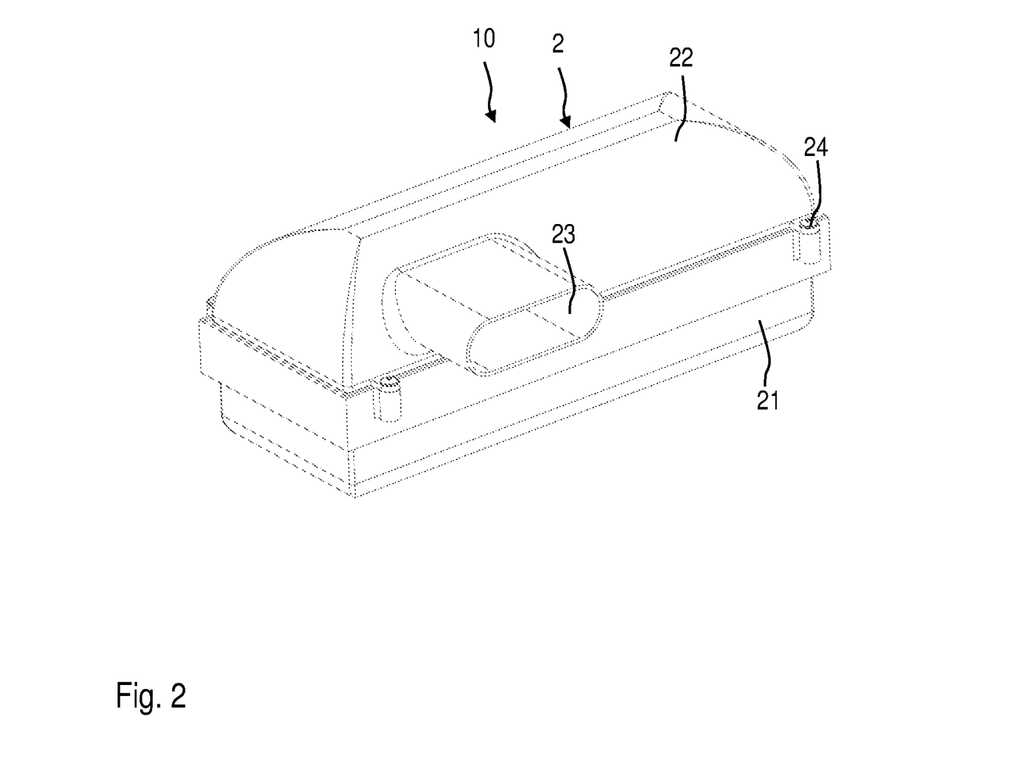
FIG. 2 shows an isometric view of a filter according to the embodiments.

The filter 10 for the interior according to the embodiments is illustrated in FIG. 2 in an isometric view. The filter 10 for the interior has a housing 2 with a filter housing part 21 and a filter housing cover 22 which closes off the filter housing 2. The filter housing cover 22 is detachably connected by connector elements 24, here screws, to the filter housing part 21 so that in a servicing situation the filter elements contained therein can be exchanged. The filter housing 2 has an inlet opening 23 as well as an outlet opening 25 (see FIG. 3). Through the inlet opening 23 unfiltered raw air can be supplied to the filter housing 2 and through the outlet opening filtered clean air can be discharged from the filter housing 2. In the filter housing 2, two filter elements are arranged which filter the air, which is illustrated in the longitudinal section of FIG. 3.

Figure 3:
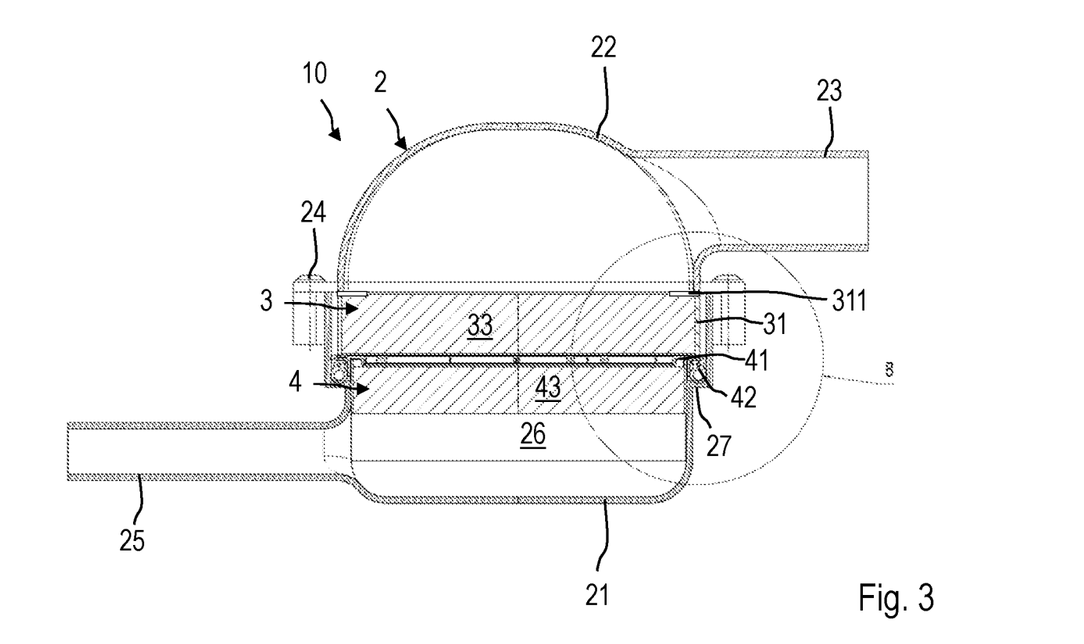
FIG. 3 shows a longitudinal section of a filter according to the embodiments.

The filter housing 2 provides a receiving space 26 in which a first filter element 3 as well as a second filter element 4 are arranged. In operation of the filter 2, the filter elements 3, 4 are flowed through serially, i.e., the air flow is guided from the inlet opening 23 through the first filter element 3, then through the second filter element 4 all the way to the outlet opening 25.

The filter elements 3, 4 each comprise a frame device 31, 41 as well as a filter medium body 33, 43, wherein the filter medium bodies 33, 43 comprise preferably a filter medium folded to a folded bellows.

The frame device 31 of the first filter element 3 comprises a strip-shaped nonwoven material which is connected to the filter medium body 33 of the first filter element 3. The frame device 31 is comprised of so-called head strips and lateral strips. This filter element configuration has the advantage that it can be produced particularly inexpensively; however, it is mechanically loadable only to a very limited extent, in particular due to minimal bending stiffness and compressive strength.

The frame device 41 of the second filter element 4 comprises a plastic frame to which the filter medium body 43 of the second filter element 4 is connected. The filter medium body 43 of the second filter element 4 comprises a secondary frame device 423 which—like the first filter element 3—comprises a strip-shaped nonwoven material, the so-called head strips and lateral strips. The filter medium body 43 is glued to the plastic frame of the frame device 41 of the second filter element 4 or connected in a different manner appearing suitable to a person of skill in the art. As an alternative, the second filter element 4 can also be a plastic over-molded filter element (not illustrated) in which the secondary frame device 423 can be dispensed with because the frame device 41 is joined directly by material fusion to the filter medium body 43 by the over-molding process.

The frame device 41 of the second filter element 4 comprises a circumferentially extending seal 42 which comprises a hollow chamber profile which comprises a particularly minimal compressive strength.

In the illustrated mounted state of the filter 10, a clamping force from the filter housing cover 22 is introduced into the frame device 31 of the first filter element 3 at an axial end of the frame device 31 of the first filter element 3 which is proximal to the filter housing cover 22. The frame device 31 of the first filter element 3 rests with its axial end facing away from the filter housing cover 22 on the frame device 41 of the second filter element 4 and transmits the clamping force. In this way, the circumferentially extending seal 42 of the second filter element 4 is brought into seal-tight contact at the radially inwardly projecting, circumferentially extending contact shoulder 27 of the filter housing 2 at a predetermined compression.

The first filter element 3 does not comprise its own seal in relation to the housing 2 but is indirectly sealed by the seal 42 of the second filter element in relation to the housing 2.

Figure 4:
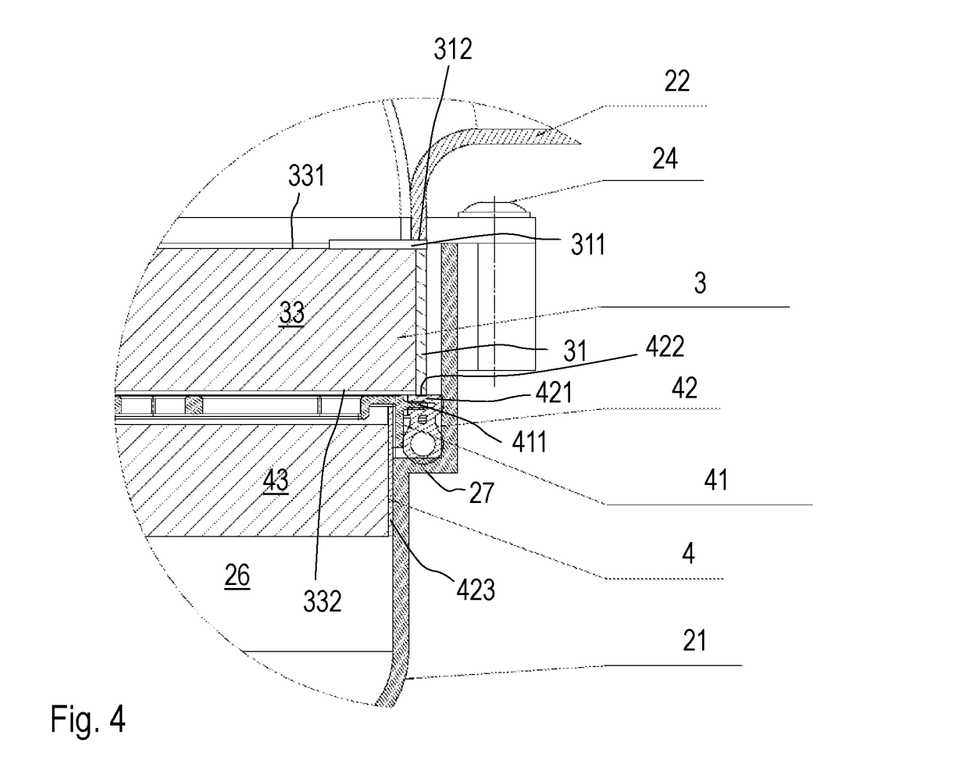
FIG. 4 shows detail B according to FIG. 3.

The interface between the first and the second filter element 3, 4 as well as the filter housing part 21 and the filter housing cover 22 is illustrated in detail B in FIG. 4 at a somewhat larger scale.

At its axial end which is proximal to the filter housing cover 22, the frame device 31 of the first filter element 3 comprises a rim section 311 which is turned over toward the filter medium body 33 and provides an axially directed force introduction surface 312 for introducing the clamping force from the filter housing cover 22. The rim section 311 rests on an inflow-side surface 331 of the filter medium body 33 and contributes to increasing the stiffness of the first filter element 3 as a whole; this is advantageous in particular under the action of the clamping force.

At its axial end which is facing away from the filter housing cover 22, the frame device 31 of the first filter element 3 projects past the filter medium body 33 at an outflow-side surface 332 so that it is ensured that a clamping force is transmitted exclusively through the frame device 31 of the first filter element 3 to the frame device 41 of the second filter element 4 and not through a contact of sections of the filter medium body 33 of the first filter element 3.

The circumferentially extending seal 42 of the frame device 41 of the second filter element 4 comprises a contact section 422 which is provided by a radially retracted collar section 421 of the seal 42. The frame device 31 of the first filter element 3 axially rests on this contact section 422 and transmits the clamping force. Since the collar section 421 is comprised of the material of the seal 42, the first filter element is sealed at the same time indirectly in relation to the filter housing 2 in this way, in addition to a transmission of the clamping force.

The circumferentially extending seal 42 which comprises the hollow chamber profile is mounted on a radially projecting collar 411 of the frame device 41 of the second filter element 4 and is axially compressed in relation to a radially oriented wall of the contact shoulder 27 of the filter housing 2 in the mounted state. The seal 42 is received in sort of a chamber of the filter housing 2, wherein the chamber is formed by the contact shoulder 27 and an axially extending wall section of the filter housing 2. In this context, the axially extending wall section prevents an excessive radial "escape" of the seal under the action of the clamping force, which escape could reduce the sealing action. In embodiments (not illustrated), the circumferentially extending seal 42 can have at least one radially projecting seal lip which can be brought into radial seal-tight contact at the axially extending wall section; this has the potential of further improving the sealing action. The illustrated contour of the seal 42 comprises no decided lip geometry but rests radially outwardly at the axially extending wall section in the region of the plane of the radially projecting collar 411 of the frame device 41.

Figure 5:
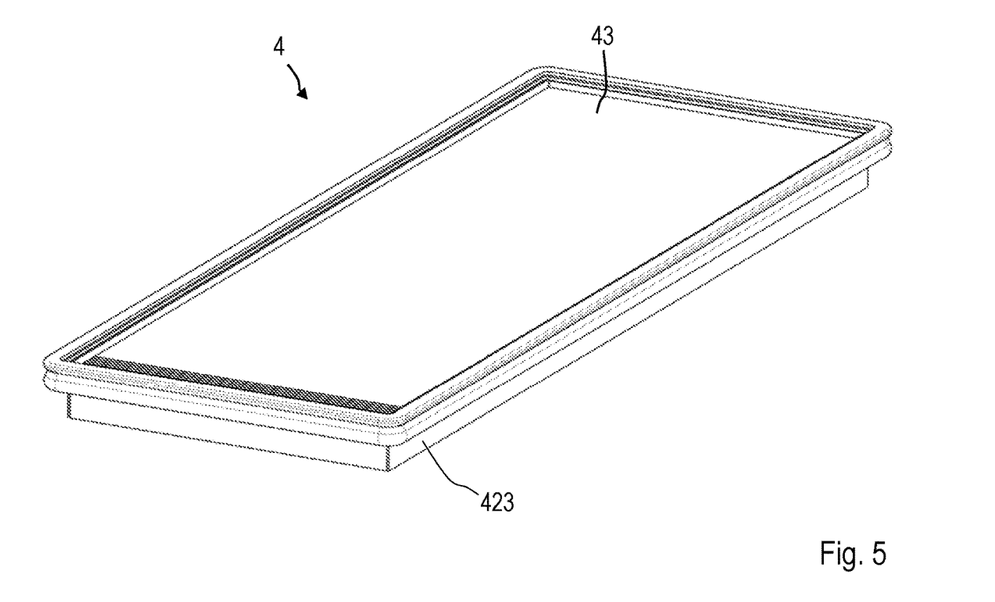
FIG. 5 shows an isometric view of a filter element according to the embodiments.
Figure 6:
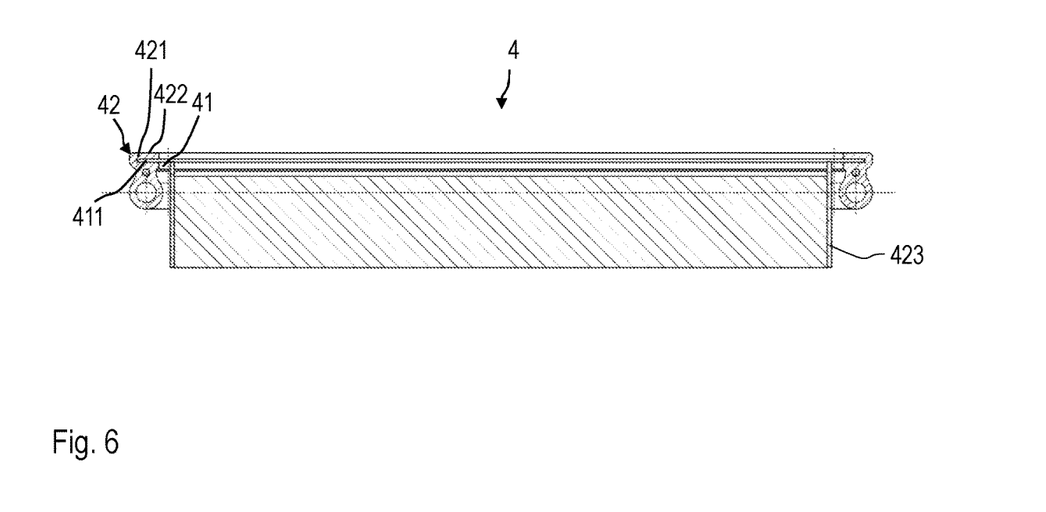
FIG. 6 shows a longitudinal section of a filter element according to the embodiments.

In FIGS. 5 and 6, a filter element 4 according to the embodiments is illustrated which is the second filter element of the filter according to the embodiments. Here, embodiments of the filter medium body 43 as a pleated folded bellows are indicated; however, the embodiments are expressly not limited to this.

The invention claimed is:
1. A filter comprising:
a filter housing comprising at least one filter housing part, a filter housing cover, a receiving space, at least one air inflow opening and at least one air outflow opening,
wherein the filter housing cover is configured to be coupled to the filter housing part in a mounted state and to close off the receiving space in the mounted state,
wherein the receiving space is configured to receive at least two filter elements, each of the at least two filter elements comprising a filter medium body and a frame device circumferentially extending around the filter medium body, and the at least two filter elements comprising a first filter element and a second filter element,
wherein the filter housing comprises at least one radially inwardly projecting, circumferentially extending contact shoulder disposed in the receiving space,
wherein the filter housing cover is further configured to, in the mounted state, exert an at least partially axially directed clamping force on the frame device of the first filter element, the frame device of the first filter element comprising an axial end facing away from the filter housing cover, the axial end facing away from the filter housing cover resting on the frame device of the second filter element in the mounted state, and the clamping force being transmitted through the frame device of the first filter element to the frame device of the second filter element, wherein the frame device of the second filter element comprises a circumferentially extending seal configured to seal-tightly contact the at least one radially inwardly projecting, circumferentially extending contact shoulder of the filter housing, the circumferentially extending seal being pressed by the clamping force on the at least one radially inwardly projecting, circumferentially extending contact shoulder of the filter housing in the mounted state, and wherein the circumferentially extending seal comprises a hollow chamber profile.

2. The filter according to claim 1, wherein a compressive strength of the circumferentially extending seal is dimensioned such that an impermissible mechanical load of the frame device of the first filter element by seal reaction forces of the circumferentially extending seal is prevented.

3. The filter according to claim 1, wherein the frame device of the first filter element is configured to rest on a contact section of the circumferentially extending seal in the mounted state, the first filter element being sealed in relation to the second filter element.

4. The filter according to claim 3, wherein the circumferentially extending seal comprises a circumferentially extending, radially retracted collar section providing the contact section for the frame device of the first filter element.

5. The filter according to claim 1, wherein the frame device of the first filter element comprises a nonwoven material.

6. The filter according to claim 5, wherein the frame device of the first filter element along a longitudinal side of the filter medium body of the first filter element and/or a width side of the filter medium body of the first filter element is embodied in any one or any combination of a strip shape, a band shape, and an areal shape.

7. The filter according to claim 1, wherein the frame device of the first filter element comprises an axial end facing the filter housing cover, the axial end facing the filter housing cover having a rim section extending at least partially in a circumferential direction, and the rim section being turned over toward the filter medium body of the first filter element and providing an axially directed force introduction surface configured to introduce the clamping force from the filter housing cover into the frame device of the first filter element.

8. The filter according to claim 1, wherein the frame device of the second filter element comprises a plastic frame, and wherein the plastic frame comprises an at least partially circumferentially extending, radially projecting collar, the at least partially circumferentially extending, radially projecting collar carrying the circumferentially extending seal, and the at least partially circumferentially extending, radially projecting collar being spaced apart in an axial direction from an axial end of the filter medium body of the second filter element.

9. The filter according to claim 8, wherein the circumferentially extending seal extends from the at least partially circumferentially extending, radially projecting collar in the axial direction into a region positioned adjacent to the filter medium body of the second filter element.

10. The filter according to claim 1, wherein the circumferentially extending seal is injection molded to the frame device of the second filter element or is mounted as a separate part on the frame device of the second filter element.

11. The filter according to claim 1, wherein the circumferentially extending seal comprises ethylene propylene diene (monomer) rubber.

12. The filter according to claim 1, wherein the circumferentially extending seal comprises at least one circumferentially extending, radially projecting seal lip configured to rest radially sealingly at an inner wall of the filter housing in the mounted state.

13. The filter according to claim 1, wherein the first filter element comprises, at least in a width direction of the first filter element or a length direction of the first filter element, a smaller dimension than the second filter element.

14. The filter according to claim 1, wherein the filter medium body of the first filter element and/or the filter medium body of the second filter element comprises a filter medium pleated to a folded bellows.

15. The filter according to claim 1, wherein the filter medium body of the first filter element comprises a filter medium pleated to a folded bellows, wherein the filter medium body of the second filter element comprises a filter medium pleated to a folded bellows, and wherein a fold spacing of the folded bellows of the filter medium body of the second filter element is smaller than a fold spacing of the folded bellows of the filter medium body of the first filter element.

16. The filter according to claim 1, wherein the axial end facing away from the filter housing cover projects axially past the filter medium body of the first filter element.

17. The filter according to claim 1, wherein the filter medium body of the first filter element comprises a particle filter medium and/or a gas adsorption medium, and/or wherein the filter medium body of the second filter element comprises a HEPA filter medium.

18. A filter element as the second filter element for the filter according to claim 1, wherein the second filter element comprises:

the filter medium body; and the frame device circumferentially extending around the filter medium body, and comprising the circumferentially extending seal configured to, in the mounted state of the second filter element in the filter, be pressed by the clamping force on the contact shoulder of the filter housing of the filter, the circumferentially extending seal comprising the hollow chamber profile, the circumferentially extending seal comprising an axially oriented contact section configured to seal-tightly contact the frame device of the first filter element of the filter in the mounted state of the second filter element in the filter, and the axially oriented contact section being a circumferentially extending, radially retracted collar section of the circumferentially extending seal of the second filter element.

19. A motor vehicle comprising the filter according to claim 1.

20. A method comprising:

arranging a first filter element, comprising a filter medium body and a frame device circumferentially extending around the filter medium body, in a receiving space of a filter housing of a filter;

arranging a second filter element, comprising a filter medium body and a frame device circumferentially extending around the filter medium body, in the receiving space of the filter housing of the filter;

providing the frame device of the second filter element with a circumferentially extending seal comprising a hollow chamber profile;

positioning the frame device of the first filter element with an axial end facing away from a filter housing cover on the frame device of the second filter element;

exerting with the filter housing cover of the filter housing an at least partially axially directed clamping force on the frame device of the first filter element;

transmitting the clamping force through the frame device of the first filter element to the frame device of the second filter element; and pressing the circumferentially extending seal by the clamping force on a contact shoulder of the filter housing disposed in the receiving space and commonly sealing the first filter element and the second filter element in relation to the filter housing by the circumferentially extending seal.

* * * * *